(12) United States Patent
Rupp et al.

(10) Patent No.: US 7,387,301 B2
(45) Date of Patent: Jun. 17, 2008

(54) BRUSH SEAL FOR SEALING A GAP BETWEEN A ROTOR AND A STATOR

(75) Inventors: Helmut Rupp, Roth/Heubühl (DE); Karl Urlichs, Röthenbach (DE)

(73) Assignee: Siemens Aktiengesellschaft, Munich (DE)

( * ) Notice: Subject to any disclaimer, the term of this patent is extended or adjusted under 35 U.S.C. 154(b) by 174 days.

(21) Appl. No.: 10/538,413

(22) PCT Filed: Nov. 28, 2003

(86) PCT No.: PCT/EP03/13437
§ 371 (c)(1),
(2), (4) Date: Jun. 10, 2005

(87) PCT Pub. No.: WO2004/053363
PCT Pub. Date: Jun. 24, 2004

(65) Prior Publication Data
US 2006/0038351 A1    Feb. 23, 2006

(30) Foreign Application Priority Data
Dec. 11, 2002   (DE) ............................. 102 58 096

(51) Int. Cl.
F01D 11/02 (2006.01)
(52) U.S. Cl. ........................ 277/355; 277/411
(58) Field of Classification Search ............... 277/355, 277/411
See application file for complete search history.

(56) References Cited

U.S. PATENT DOCUMENTS

| 3,434,727 A | * | 3/1969 | Kollenberger | ............. 277/577 |
| 3,773,336 A | * | 11/1973 | Walter et al. | ............. 277/551 |
| 5,066,024 A |   | 11/1991 | Reisinger et al. |  |
| 5,090,710 A | * | 2/1992 | Flower | ............. 277/355 |
| 5,174,582 A | * | 12/1992 | Ferguson | ............. 277/355 |
| 5,758,879 A | * | 6/1998 | Flower | ............. 277/303 |
| 6,254,344 B1 | * | 7/2001 | Wright et al. | ............. 415/231 |
| 6,517,314 B1 | * | 2/2003 | Burnett et al. | ............. 415/173.7 |
| 6,623,238 B2 | * | 9/2003 | Langston et al. | ............. 415/112 |
| 6,685,190 B1 | * | 2/2004 | Mayer et al. | ............. 277/355 |
| 6,779,799 B2 | * | 8/2004 | Tong et al. | ............. 277/411 |
| 6,827,350 B2 | * | 12/2004 | Walcott et al. | ............. 277/355 |
| 6,991,235 B2 | * | 1/2006 | Ebert et al. | ............. 277/355 |

FOREIGN PATENT DOCUMENTS

| DE | 39 07 614 A1 | 9/1990 |
| DE | 196 39 328 A1 | 3/1998 |
| DE | 196 42 781 A1 | 4/1998 |
| DE | 197 12 088 A1 | 10/1998 |
| DE | 197 20 648 A1 | 11/1998 |
| DE | 197 20 648 C2 | 7/2000 |
| DE | 199 38 268 A1 | 2/2001 |
| WO | WO 99/06673 | 2/1999 |

* cited by examiner

Primary Examiner—Patricia Engle
Assistant Examiner—Gilbert Y Lee

(57) ABSTRACT

The invention relates to a brush seal for sealing a gap between a rotor and a stator, with at least one brush ring, comprising a number of sealing brushes and at least two annular brush ring carriers, running in the circumferential direction of the rotor. Each brush ring is fixed between a first front face of a first brush ring carrier and a second front face of a second brush ring carrier, whereby the second brush ring carrier is directly axially and radially fixed to the first brush ring carrier.

12 Claims, 3 Drawing Sheets

BRUSH SEAL FOR SEALING A GAP BETWEEN A ROTOR AND A STATOR

CROSS REFERENCE TO RELATED APPLICATION

This application is the US National Stage of International Application No. PCT/EP2003/013437, filed Nov. 28, 2003 and claims the benefit thereof. The International Application claims the benefits of German Patent application No. 10258096.0 DE filed Dec. 11, 2002, both of the applications are incorporated by reference herein in their entirety.

FIELD OF THE INVENTION

This invention relates to the field of brush seals and in particular, brush seals used in turbomachinery.

BACKGROUND OF THE INVENTION

Brush seals are successfully used, for example, in turbomachines, in order to reduce the leakage flow between a rotor and a stator. Many brush seals have the disadvantage that the brush ring carriers are often not produced in one piece. This results, during operation, in out-of-roundnesses of the brush seals and of the secondary seal with respect to the housing, which have an adverse effect on the sealing action of the overall arrangement and consequently on the efficiency of the turbomachine.

DE 199 38 268 A1 discloses a brush seal, in which the brush ring is welded in between two annular one-piece brush ring carriers. This entire unit, consisting of two brush ring carriers and of a brush ring located between them, is inserted into a corresponding slot of the stator. That is to say, each brush ring requires two brush ring carriers and a slot in the stator for receiving the brush ring carriers.

DE 197 20 648 C2 discloses a brush seal, in which a brush ring is held between two brush ring carriers and the brush ring carriers are connected to one another by flanging. In this brush seal, too, each brush ring requires two brush ring carriers and a slot in the stator.

SUMMARY OF THE INVENTION

The object on which the invention is based is to provide a brush seal arrangement which is further improved with regard to the sealing action and to the outlay in terms of production and of assembly.

In a brush seal according to the invention for sealing a gap between a rotor and a stator, in particular of a turbomachine, with at least one brush ring having a multiplicity of sealing bristles, and with two annular brush carriers extending in the circumferential direction of the rotor, each brush ring being fixed between a first end face of a first brush ring carrier and a second end face of a second brush ring carrier, this object is achieved, according to the invention, in that the second brush ring carrier is directly fixed axially and radially to the first brush ring carrier. This may take place, for example, by means of an annular clamping connection.

By virtue of this measure, the outlay in terms of production and of assembly can be markedly reduced, since, merely by plugging the second brush ring carrier and the first brush ring carrier one into the other, an axial and radial fixing of the second brush ring carrier takes place, said fixing preventing complicated and cost-intensive adjusting and fixing work. Moreover, the brush ring carrier has a rotationally symmetrical construction, so that roundness is maintained, even under changing operating conditions.

Of course, a plurality of brush rings may also be arranged one behind the other in this way, only one further brush ring carrier being required for each additional brush ring. This, too, results in a considerable cost saving, without disadvantages with regard to the functionality and sealing action of the brush seal according to the invention.

Finally, the necessary construction space is also very small.

In connection with the invention, reference is made below to a first brush ring carrier and a second brush ring carrier. This is intended to make a distinction between two components which are identical per se. The first brush ring carrier is arranged downstream of the second brush ring carrier in the direction of flow of the fluid flowing through the sealing gap.

In an advantageous variant of the invention, there is provision for a slot to be formed between a first brush ring carrier, in the direction of flow of the fluid to be sealed, and a second brush ring carrier, in the direction of flow of the fluid to be sealed, and for the slot to serve for receiving the brush ring. By means of this slot, the brush ring is axially and radially fixed, likewise without any additional outlay for centering and fixing the latter, in the brush ring carriers when the second brush ring carrier is pushed onto the first brush ring carrier. According to the invention, the slot for receiving the brush ring may be present either completely in the first brush ring carrier or in the second brush ring carrier or partially in both.

The brush ring is the actual sealing element which consists of a multiplicity of sealing bristles. The sealing bristles are arranged, where a radial seal is concerned, in such a way that, in the installed state, the sealing bristles just touch the rotor.

It has proved particularly advantageous if the second brush ring carrier is fixed to the first brush ring carrier by means of a snap connection, in particular an unreleasable snap connection. In this embodiment, the connection between the first brush ring carrier and second brush ring carrier can be made very simply and cost-effectively.

In a further advantageous embodiment of the invention, there is provision for at least one first brush ring carrier to have on its first end face a shoulder with a circumferential slot, for at least one second brush ring carrier to have on its second end face a continuous projection, and for the projection of the second brush ring carrier to cooperate with the shoulder and with the circumferential slot of an adjacently arranged first brush ring carrier, in such a way that an axial and radial fixing of the second brush ring carrier in relation to the first brush ring carrier takes place. This connection between the first brush ring carrier and the second brush ring carrier may also be designed as a snap connection, in particular as an unreleasable snap connection. In any event, however, this connection affords a good axial and radial fixing of the second brush ring carrier, at the same time with low production costs, since the shoulder and circumferential slot and also the projection can be produced simply on a lathe in one chucking operation.

In a further embodiment according to the invention, there is provision for at least one brush ring carrier to have on its first end face a shoulder with a circumferential slot, for at least one brush ring carrier to have on its second end face a continuous projection, and for the projection of the first end face of the at least one brush ring carrier to cooperate with the shoulder and with the circumferential slot of an adjacently arranged further brush ring carrier. It is thereby possible to arrange any number of brush ring carriers and brush rings one behind the other, in which case completely identical components may be used, with the exception of an initial piece and an end piece. The production costs are thereby further reduced. The number of brush rings arranged in a row will be defined, as a rule, as a function of the existing construction space and the desired sealing action. In examples implemented in practice, it has proved possible for a brush ring carrier to have a thickness of about 12 mm, so that a brush ring can be arranged every 12 mm. As a result of this, too, the brush seal according to the invention is highly space-saving and therefore, with the construction space remaining the same, more brush rings than has been conventional hitherto can be provided.

In order to fix the brush seal securely in relation to the stator, there is provision for a brush ring carrier to be held at least indirectly on the stator. This may take place by means of a slot in the stator, screws or other means known from the prior art.

It has proved advantageous if the circumferential slot is arranged in the part mounted first and the latching nose is located in the newly pushed-on part. To be precise, if the latching connection is unreleasable (irreversible), as may be provided according to the invention, the advantage of this is that, in the event of a manufacturing error, only the brush ring carrier mounted last has to be demounted in a destructive way by the projection being twisted off.

In order to improve the sealing action of the brush seal according to the invention, there is provision for the brush ring carrier or brush ring carriers to have a support plate and/or a protective ring which extend from the brush ring carrier in the direction of the rotor and against which the brush seal bears, supported axially, on at least one axial side. Such support plates and protective rings are known per se from the prior art; however, in the brush seal according to the invention, a support plate and a protective ring may be lathe-turned directly out of the brush ring carrier, so that, either using the supporting means, the brush ring carrier remains in one piece and the number of components required and consequently also the outlay in production terms further remain minimal.

In a further advantageous embodiment of the invention, the support plate and the protective ring are designed to be radially elastic, so that, in the event of the rotor running up against the supporting means, these can shift aside in the radial direction, without causing damage or being damaged themselves. As soon as the rotor returns to its original centric position again, the axial supporting means resume their original shape and position.

The action of the brush seal according to the invention may be further improved if the rotor to be sealed off has at least one continuous bead, and the at least one bead is arranged so as to be offset with respect to the brush ring or brush rings. This bead, which may, for example, have a height of 0.7 mm, deflects the fluid flow emerging through the sealing gap in such a way that the brush rings lying downstream of the bead cannot be damaged by the fluid jet arriving upstream. Of course, in the dimensioning of the height of the bead, care must be taken to ensure that the brush seal and the axial supporting means can be pushed over the bead and are not damaged during the mounting of the brush seal according to the invention.

Further advantages and advantageous embodiments may be gathered from the following drawing, its description and the patent claims.

DETAILED DESCRIPTION OF THE INVENTION

Figure 1:
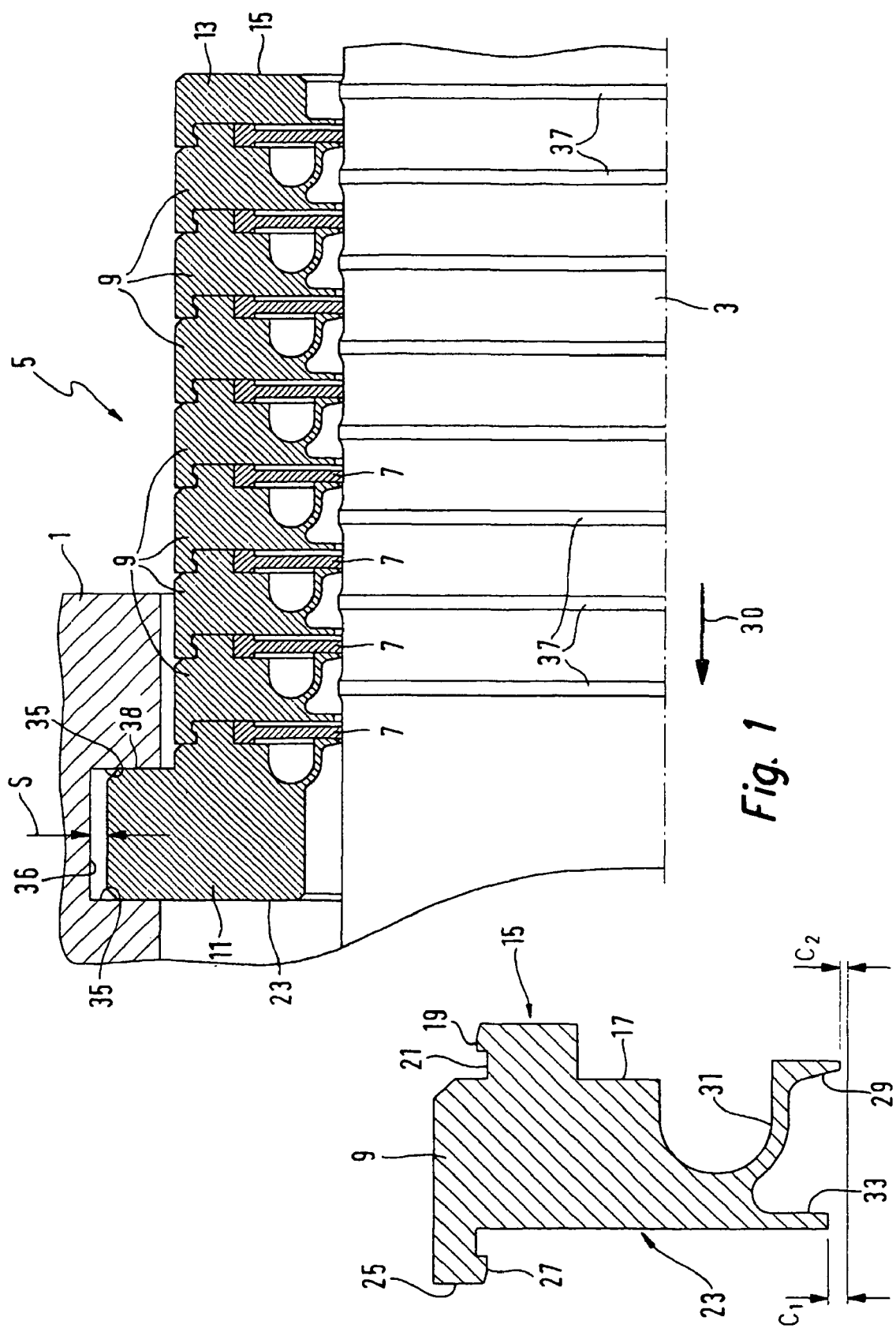
FIG. 1 shows a first exemplary embodiment of a brush seal according to the invention in section.

FIG. 1 shows a first exemplary embodiment of a seal according to the invention which is arranged between a stator 1 and a rotor 3 of a turbomachine. The brush seal, of multistage design in the first exemplary embodiment, is designated as a whole in FIG. 1 by 5. The brush seal 5 consists essentially of brush rings 7 which are fixed axially and radially in brush ring carriers 9, 11 and 13. Brush seals according to the invention may also be of single-stage design, that is to say with only one brush ring.

An individual brush ring carrier 9 has been illustrated, enlarged, in FIG. 1. Referring to this individual brush ring carrier 9, the shape and functioning of the latter are explained below. The other brush ring carriers 9 are constructed identically. The other brush ring carriers 11 and 13 are constructed partially identically.

So as not to be detrimental to clarity in FIG. 1, not all the brush ring carriers 9, 11 and 13 have been given reference symbols.

The brush ring carrier 9 has a first end face 15. On this first end face 15, a slot 17 is cut out, into which a brush ring 7 can be inserted. A shoulder 19 with a circumferential slot 21 is formed in the first end face 15 on the outside diameter of the brush ring carrier 9.

On a second end face 23, there is a continuous projection 25 which is dimensioned such that it can be pushed onto a shoulder 19 of an adjacently arranged brush ring carrier 9. This results in an axial and radial fixing of two adjacently arranged brush ring carriers 9 in relation to one another. The projection 25 has provided on it a latching nose 27 which can latch into the circumferential slot 21 on a first end face 17 of an adjacently arranged brush ring carrier 9. In the exemplary embodiment illustrated in FIG. 1, the circumferential slot 21 and the latching nose 27 form a snap connection.

As may be gathered from the overall view of the brush seal 5 according to the invention in FIG. 1, a plurality of brush ring carriers 9 are connected to one another, in that the projection 25 on the second end face 23 of a brush ring carrier 9 is pushed onto a shoulder 19 of a first end face 15 of an adjacently arranged brush ring carrier 9. A releasable or unreleasable snap connection can be made by means of the circumferential slot 21 and the latching nose 27. The slot 17 on the first end face 15 is designed in terms of diameter and depth in such a way that a brush ring 7 is clamped between two brush ring carriers 9 and fixed axially and radially when these brush ring carriers 9 are latched together with one another.

The arrangement of this latching together expediently takes place such that, as illustrated, the circumferential slot 21 is located in the part mounted first and the latching nose 27 is located in the newly pushed-on part.

If, as may be provided according to the invention, the latching connection is unreleasable (irreversible), the advantage of this is that, in the event of a manufacturing error, only the ring 9 mounted last has to be demounted in a destructive way by the projection 25 being twisted off.

In order to support the brush rings 7 axially, a support plate 29 is provided on the first end face 15 of the brush ring carrier 9. The first end face 15 is arranged on the brush ring carrier 9 at the front, as seen in the direction of flow of the fluid flowing through the sealing gap. The direction of flow is illustrated by an arrow 30 in FIG. 1. The support plates 29 are arranged after a brush ring 7 and are designed to be radially elastic, since a cavity 31 is cut out in the brush ring carrier 9. If the rotor 3 were to be brushed against, the gap $C_2$ between the rotor 3 and support plate 29 would disappear and the support plate 29 would spring back radially.

On the second end face 23, a protective ring 33 is provided, which is less elastic in the axial direction than the support plate 29, since it is normally provided with a larger gap C, with respect to the rotor 3. The second end face 23 is arranged in front of a brush ring 7, as seen in the direction of flow 30 of the fluid flowing through the sealing gap. Depending on demand and requirements, the radial elasticity of the support plate 29 or of the protective ring 33 between the two versions, illustrated in the enlargement in FIG. 1, on the first end face 15 and on the second end face 23 may be varied.

The gap $c_1$ between the protective ring 33 and rotor 3 is, as a rule, somewhat larger than a gap $c_2$ between the support plate 29 and rotor 3, whilst preventing the latter from brushing against the protective ring 33. To be precise, before the brushing against the protective ring 33, the brush seal 5 shifts away from the rotor 3 in the axial direction (see the double arrow S).

The brush ring carrier 13, which is arranged on the far right in FIG. 1 as a closing-off piece, differs from the brush ring carriers 9 in that, according to the invention, only a second end face 23 is designed with a projection 25 and with a latching nose 27. In this bush ring carrier 13, the first end face 15 is designed as a plane face.

The brush ring carrier 11 differs from the brush ring carriers 9 described in detail in that only a first end face 15 is designed with a slot 17, shoulder 19, circumferential slot 21 and support plate 29. The second end face 23 is designed as a plane face. A brush ring carrier 9 can be fastened to the first end face 15 in the way described above.

In parallel with this second end face 23, a further plane face 38, which runs parallel to the second end face 23, is formed on the brush ring carrier 11. The stator 1 has made in it a second slot 36 into which the brush ring carrier 11 is introduced. The brush seal 5 according to the invention is thereby connected to the stator 1, specifically in such a way that some radial displacement and adjustment, which is indicated in FIG. 1 by the double arrow S, is possible. This radial displacement may be utilized, during assembly, in order to orient the brush seal 5 in relation to the rotor 3.

Sealing between the brush ring carrier 11 and stator 1 takes place via the second end face 23 and the corresponding plane face 35 of the second slot 36, since, as a result of the pressure difference in front of and behind the brush seal 5, the brush seal 5 is pressed against said plane face of the stator 1. Should this pressing force not be sufficient, additional prestressing elements (not illustrated) may be provided, which press the brush ring carrier 11 with its second end face 23 against the stator 1.

The brush ring carriers 11, 9 and 13 may be additionally connected to one another and secured by means of screws (not illustrated).

On the rotor 3, between the brush rings 7, continuous beads 37 are provided which deflect the fluid escaping through the sealing gap in such a way that the brush ring 7 located downstream of a bead 37 is not damaged by the outflowing fluid and the sealing action of the brush seal 5 according to the invention is improved.

In practice, a height of 0.7 mm has proved expedient for beads 37. Care must be taken, in any event, to ensure that the beads are not so high that it becomes impossible to mount the brush rings 7 and the brush ring carriers 11 and 13.

Figure 2:
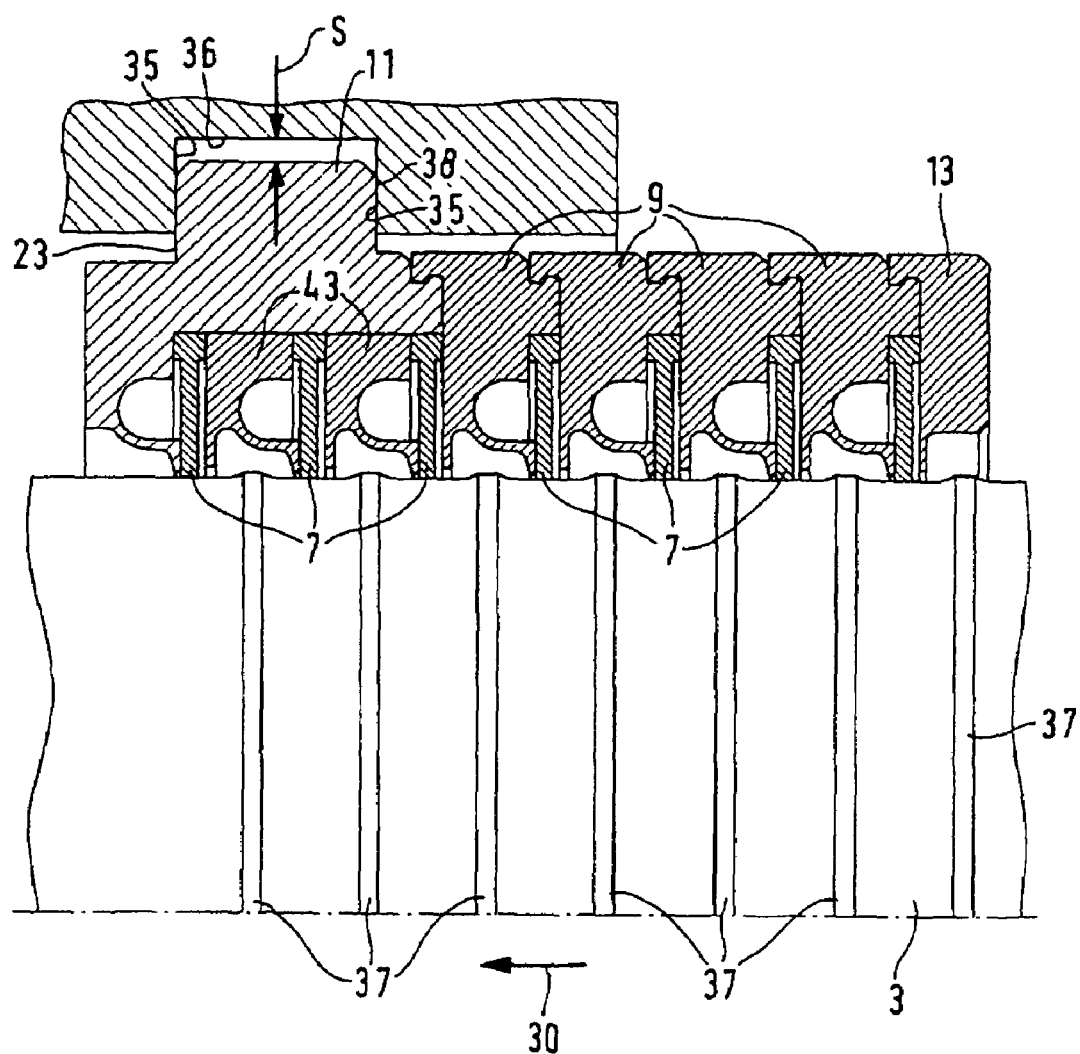
FIG. 2 shows a second exemplary embodiment of a brush seal according to the invention on a balancing piston of a steam turbine.

FIG. 2 illustrates a second exemplary embodiment of a brush seal 5 according to the invention. In the application according to FIG. 2, the brush seal 5 according to the invention seals off a rotor 3, in particular a turbine rotor. The basic construction is the same in this exemplary embodiment as in the exemplary embodiment according to FIG. 1. A detailed description is therefore dispensed with. Also, for the sake of clarity, not all the reference symbols are entered.

An essential difference of the second exemplary embodiment from the exemplary embodiment according to FIG. 1 is that brush rings 7 are fastened in the brush ring carrier 11 by means of brush ring carriers 43. The brush ring carriers 43 are constructed in a similar way to the brush ring carriers 9 described above. In the exemplary embodiment illustrated in FIG. 2, after the third brush ring 7, one of the brush ring carriers 9 described in detail above with reference to FIG. 1 adjoins the brush ring carrier 11. However, the invention is not restricted to two brush ring carriers 43. Instead, the number of brush rings 7 depends on the intended use of the brush seal arrangement according to the invention. By virtue of this type of construction, the space requirement for the brush seal 5 according to the invention can be reduced and the outlay in terms of production reduced.

The brush ring carrier 11 and/or the brush rings 9 and 13 may additionally be connected to one another by means of screws, not illustrated.

Figure 3:
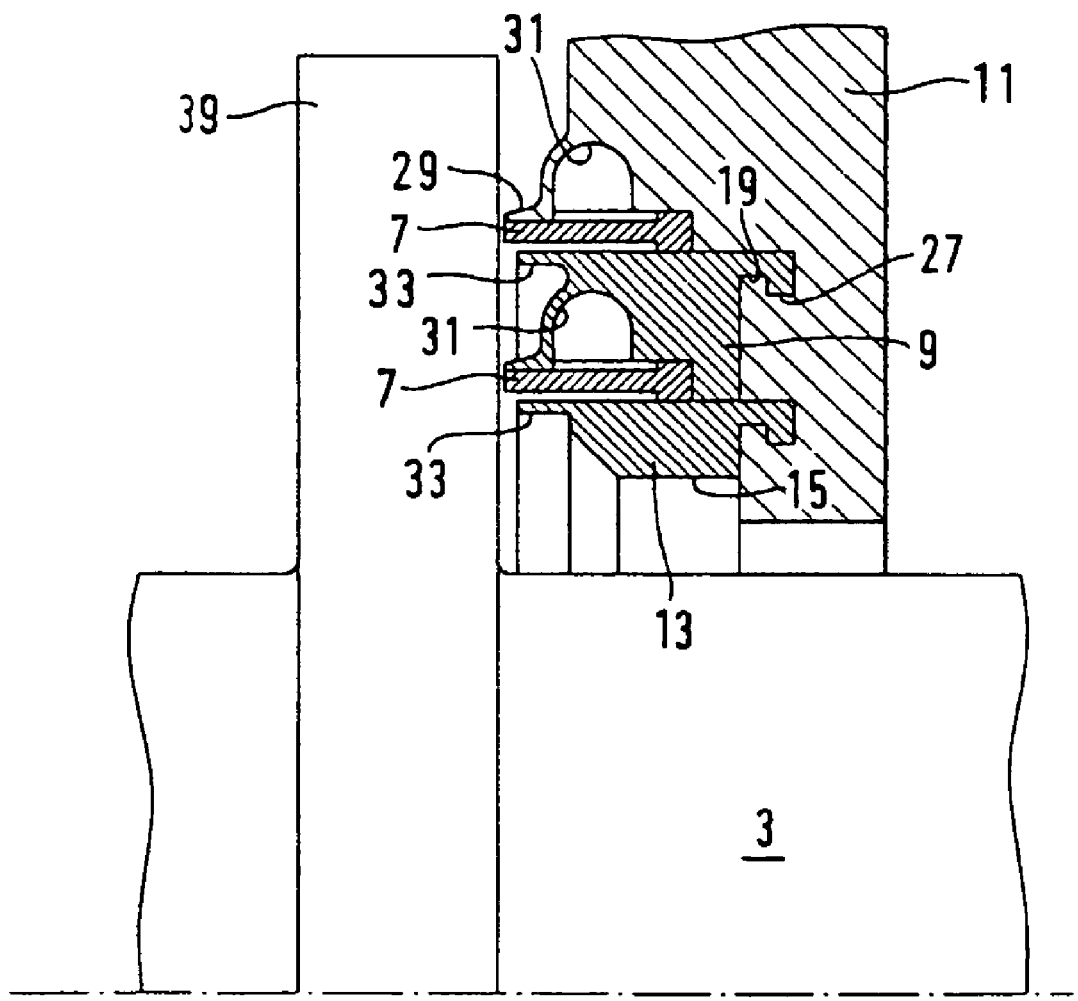
FIG. 3 shows a third exemplary embodiment of a brush seal according to the invention for axial sealing off.

FIG. 3 illustrates a third exemplary embodiment of a brush seal 5 according to the invention by the example of a balancing piston 39 of a rotor 3. In this case, the brush seal 5 is designed as an axial seal. In this exemplary embodiment, the sealing bristles of the brush rings 7 are arranged cylindrically. The diameters of the brush ring carriers 11, 9 and 13 are coordinated with one another in such a way that they can be connected to one another in the axial direction by means of the snap connection described above.

The invention claimed is:

1. A brush seal for sealing a gap between a rotor and a stator, comprising:
    a brush ring having a multiplicity of sealing bristles, and with at least two annular brush ring carriers extending in the circumferential direction of the rotor, each brush ring being fixed between a first end face of a first brush ring carrier and a second end face of a second brush ring carrier, and the second brush ring carrier being directly fixed axially end radially to the first brush ring carrier,
    wherein the second brush ring carrier is fixed to the first brush ring carrier by an unrealeasable snap connection.

2. The brush seal as claimed in claim 1, wherein a slot is formed between the first brush ring carrier and the second brush ring carrier and the slot receives the brush ring.

3. The brush seal as claimed in claim 1, wherein at least one first brush ring carrier has on its first end thee a shoulder with a circumferential slot and at least one second brush ring carrier has on its second end face a continuous projection, with a latching nose, end the projection and the latching nose of the second brush ring carrier cooperates with the shoulder and with the circumferential slot of an adjacently arranged first brush ring carrier, wherein the snap connection is formed between the circumferential slot and the latching nose.

4. The brush seal as claimed in claim 3, comprising a plurality of the brush ring carriers of claim 3 adapted for sequential installation onto a stator, wherein the circumferential slot of one of the plurality of the brush ring carriers is disposed to receive the latching nose of an adjacently arranged brush ring carrier.

5. The brush seal as claimed in claim 4, wherein the circumferential slot is formed disposed toward an outside diameter of the at least one first brush ring carrier.

6. The brush seal as claimed in claim 3, wherein the circumferential slot is formed disposed toward an outside diameter of the at least one first brush ring carrier.

7. The brush seal as claimed in claim 1, wherein the second brush ring carrier has on its first end face a shoulder with a circumferential slot on its second end face a continuous projection, with a latching nose, and the projection and the latching nose of the second end face of the second brush ring carrier cooperates with a shoulder and with a circumferential slot of the first brush ring carrier.

8. The brush seal as claimed in claim 1, wherein one brush ring carrier is held at least indirectly on the stator.

9. The brush seal as claimed in claim 1, wherein the brush ring carrier or brush ring carriers have a support plate that extends in the direction of the rotor and the brush rings bear axially against the support plate.

10. The brush seal as claimed in claim 1, wherein the brush ring carrier or brush ring carriers have a protective ring.

11. The brush seal as claimed in claim 10, additionally comprising a support plate, wherein at least one of the support plate and the protective ring is or are designed to be radially elastic.

12. The brush seal as claimed in claim 1, wherein the brush seal is designed as a radial seal or axial seal.

* * * * *